United States Patent Office 3,610,031
Patented Oct. 5, 1971

3,610,031
COMBINED LOAD TESTING DEVICE
Austin B. J. Clark, Oxon Hill, Md., and Whai-Sang Fu, Columbus, Ohio; said Clark assignor to the United States of America as represented by the Secretary of the Navy
Filed Jan. 19, 1970, Ser. No. 3,697
Int. Cl. G01n 3/10
U.S. Cl. 73—97                                    3 Claims

ABSTRACT OF THE DISCLOSURE

This disclosure is directed to a testing machine for studying the mechanical behavior of materials by use of a fluid under pressure applied to a material for determining stress-strain relationship, under uniaxial loading, torsion, and external pressure or combinations of the above.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Various systems have been used, heretofore, for determining stress-strain relation, i.e. material law. Some systems have made use of hydraulic pressure applied onto a piston which in turn reacts with the element being tested to apply pressure thereto to determine relation between stress and strain. Two such systems appear in Pats. 3,313,147 and 3,273,384. Another system employs a thin-walled tube under a combination of applied internal pressure, tension and torsion. Stress can be calculated from the loads applied and strain can be computed from the measured deformations and stress-strain relations may be found experimentally. For the thin-walled tube test under torsion and internal pressure, it is difficult to apply an in plane torsion if the tube wall is real thin, otherwise, the radial stress varies through the thickness and the test result may not be accurate.

SUMMARY OF THE INVENTION

This invention makes use of a thick walled cylinder which is of a material and thickness sufficient to withstand large internal pressure without noticeable deformations. Two pistons having an outer diameter the same as the inner diameter of the cylinder are placed within the cylinder ends. An opening through the cylinder wall permits fluid under pressure to be admitted into the cylinder for forcing the pistons axially outwardly. Strain is applied to a specimen secured to the pistons. The pressure applied is recorded by a pressure indicator and the tensile stress on the specimen may be computed by measuring the difference in the cross-sectional area of the cylinder heads and the specimen. Strain gauges may be placed onto the specimen for measuring the strain. Also, one piston may be fixed with respect to the cylinder and torsion applied onto the specimen by use of a torque applied to the other piston. Torque may also be applied to each piston if applied in opposite angular directions. Thus, torsion may be applied simultaneous with tension.

STATEMENT OF THE OBJECTS

It is therefore an object of the invention to provide a simple device for relating stress and strain under the combination of torsion, tension and external pressure on a test specimen as the basis for understanding the mechanical response of the specimen material under combined loading.

Another object is to provide a test machine suitable for determining information about surface conditions of different materials especially materials like glass, plastics and plexiglass.

Still another object is to provide a test device which may be operated by unskilled as well as skilled personnel.

DESCRIPTION OF THE DEVICE

Figure 1:
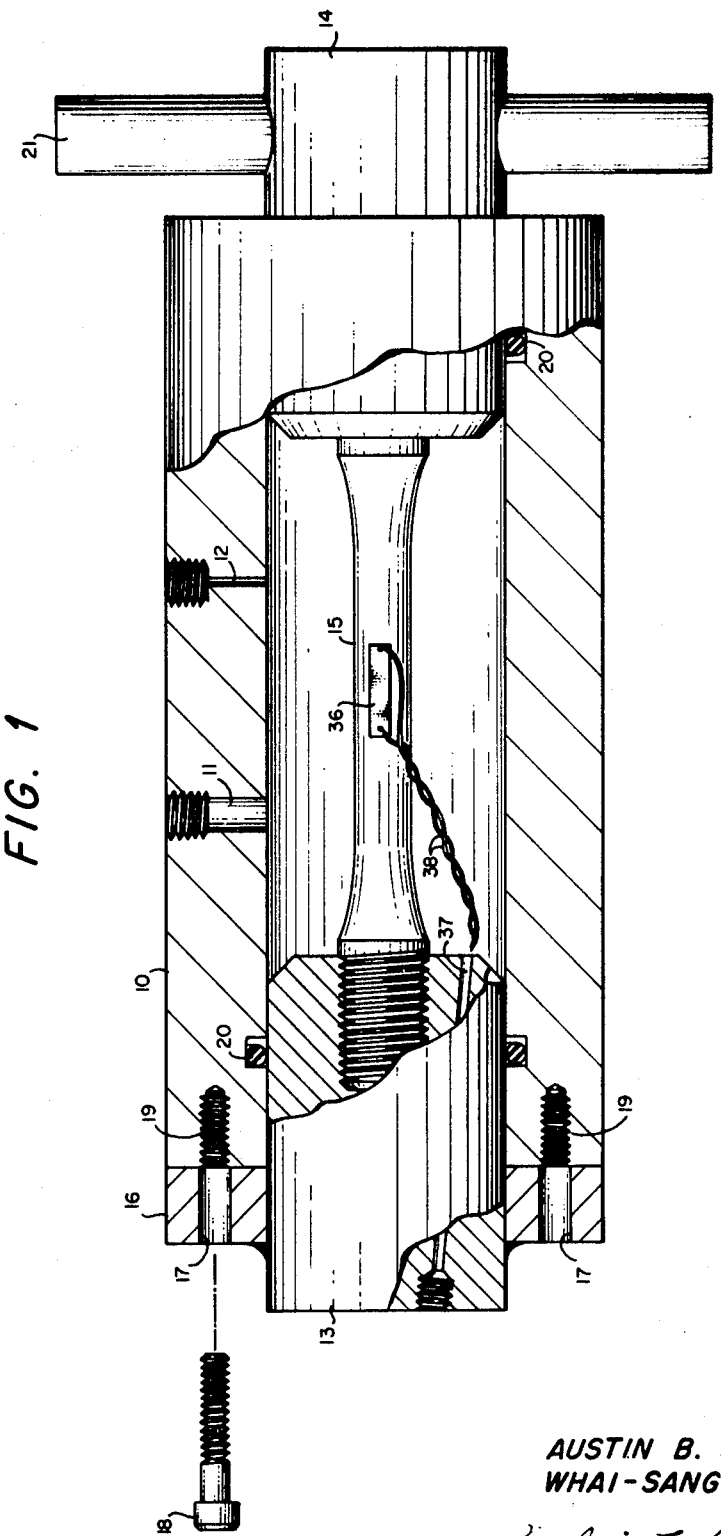
FIG. 1 is a partial cross sectional view illustrating the various parts.

Now referring to the drawing, there is shown by illustration a cylinder 10 which may be made of any suitable material and with a wall thickness sufficient to withstand pressures to be used during testing. The cylinder is open at each end and is provided with one or more apertures 11 and 12 therein. One of the apertures may be connected with a fluid pressure line for admitting a fluid under pressure into the cylinder. The other aperture is provided for the connection of a pressure indicator if desired. Other apertures may be added if necessary for any other desired connection. As shown, the apertures are more toward the center than toward the ends to avoid coverage by the test material or other elements. Pistons 13 and 14 having substantially the same outer diameter as the inner diameter of the cylinder are provided for connecting a test specimen 15 therebetween. O-rings 20 are provided between the pistons and the inner wall of the cylinder to prevent any leakage of fluid during test. The pistons have their outer ends extending from the cylinder and may have other elements secured thereto for special purposes. As shown, a ring 16 is secured to the outer end of piston 13 by any suitable method such as welding or it may be made integral therewith as by milling. The ring is provided with apertures 17 through which bolts or screws 18 may pass for securing the ring to the end of the cylinder by use of a screw threaded hole 19. Thus, the piston 13 may be fixed relative to the cylinder by passing the bolts through the apertures and threading the bolts into the end of the cylinder.

The device has been shown with two apertures through the cylinder. It will be obvious to those skilled in the art that only one or several apertures may be made depending on the instrumentation connection requirements. If only one aperture is used, then the pressure gage could be secured to the pressure line to give a reading of the pressure applied to the specimen.

Figure 2:
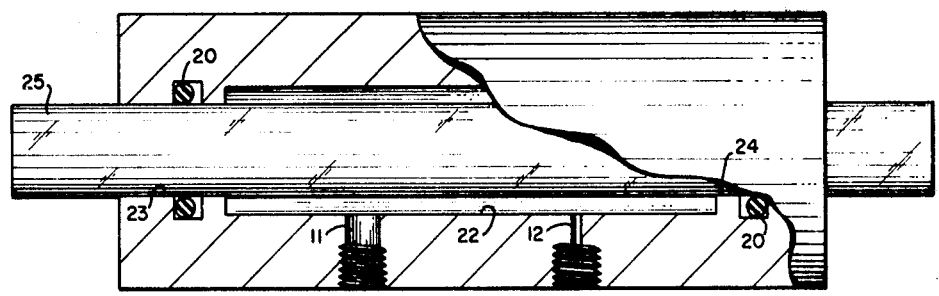
FIG. 2 is a modification of the device of FIG. 1.

FIG. 2 illustrates a pressure cylinder suitable for use in testing rods. As shown, the cylinder has a cylindrical section 22 having a greater diameter than the ends 23 and 24. The ends are of substantially the same diameter as the specimen rod 25 to be tested and the main body section is of a slightly larger diameter in order to provide a pressure area around the specimen. O-rings 20 are provided to seal the area between the specimen and the cylinder. The rods may be provided with means for securing one end to the cylinder and a cantilever secured to the other end for applying a torque thereto if desired. The cylinder could be the same diameter over its entire length, however, the spacing between the rod and the cylinder would be minute with a less pressure area for applying pressure onto the rod.

Figure 3:
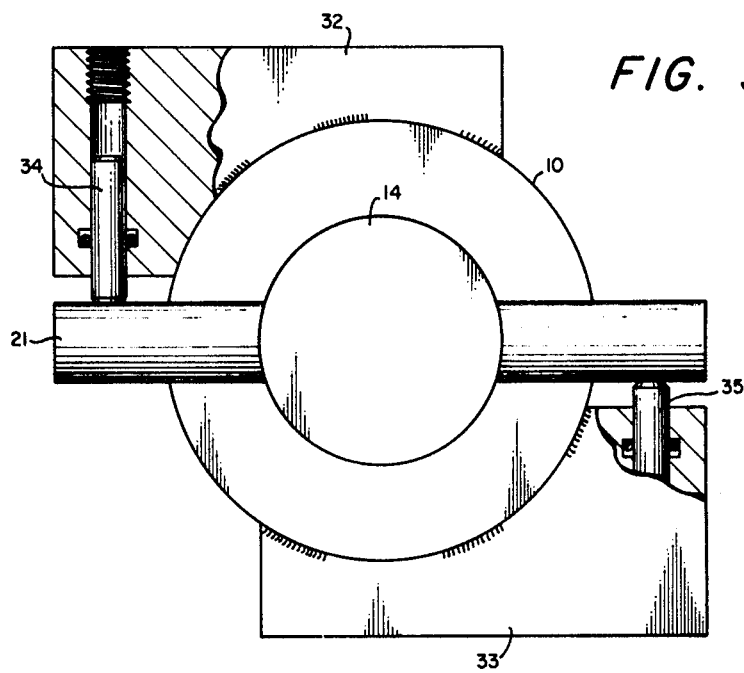
FIG. 3 illustrates torsion producing means secured to the device.

FIG. 3 illustrates a test device as described above in which a cantilever 21 is fixed to the piston 14 and rotary activators 32 and 33 are secured to the outer surface of the cylinder. Fluid driven pistons 34 and 35 operative within the rotary activators apply pressure to opposite ends of the cantilever in order to apply a torque to the specimen secured to pistons 13 and 14. In this arrangement, pistons 13 would be fixed to the cylinder as described above and shown in FIG. 1.

In some instances one may desire to secure a strain gage 36 to the test specimen to measure strain. Thus, an aperture 37 may be made through one of the pistons and the strain gage wires 38 brought out through the aperture to the outside. Bringing the wires out through the end piston, would require a pressure seal to prevent leakage of fluid.

The end of the cylinder may be marked off in degrees for the purpose of determining angular twist on the specimen relative to the cantilever which is connected to the piston. The piston 14 may have affixed thereto a lever 21 which may be used if desired to apply a torque onto the test specimen by rotation of piston 14.

The pistons 13 and 14, the ring 16 and the specimen 15 may be made from one single piece, if desired. Also, if torque is not to be applied to the test specimen or if the piston 13 is not to be secured in place, the ring may be omitted. Thus, the test specimen would be between the pistons with no extra elements secured to or made a part of the piston assembly.

In operation of the device, the test specimen is secured to the pistons at the ends thereof and the assembly is placed into the cylinder. (A strain gage may be placed onto the test specimen prior to placing into the cylinder, if desired.) Fluid of a desired predetermined pressure is applied to the specimen through an aperture in the cylinder. The fluid applies pressure radially onto the test specimen and axially on the inner ends of the pistons. The applied pressure is measured by use of the pressure gage and recorded. The tensile stress on the specimen may be determined by measuring the difference in the cross-sectional area of the piston ends and the specimen. Of course, strain may be measured by use of a strain gage secured to the test specimen.

Piston 13 may be fixed to the cylinder to prevent rotational movement thereof and pressure may be applied to the cantilever to apply a torque to the specimen. The angle of twist may be measured by noting the angular movement between the position at which no torque is applied and the final position after applying torque.

The device as shown in FIG. 1 may be used to apply radial compression on a test specimen by securing both pistons to the cylinder. However, the device as illustrated in FIG. 2 has been shown for the purpose of applying radial compression onto a test rod. When one determines the stress-strain relationship for points on the external surface of a tube by compressional forces, one is actually treating the biaxial state of stress. With the above device, the axisymmetry of a solid rod suggests the equality of unit contraction in the radial and circumferential directions. The established stress-strain relation of the above device is then that for a genuine general state of stress.

With the ends of the rod free to move, external pressure applied in the radial direction does affect the tensile stress of the rod, therefore, the above set forth device may be used to demonstrate and study the behavior of materials under axial tension by taking account of Poisson's ratio.

The use of a cylinder for a test device, as shown, permits one to change the tensile stress in a specimen by changing the applied external pressure or by changing the ratio between the cross-section of the test specimen and the area of the ends of the piston to which the specimen is secured. Valuable information on yield surface of a material may be obtained by performing combined loading test up to yielding.

The device is also useful for determining information about surface conditions of materials such as glass, plastics and plexiglass by application of fluid under pressure on the outer surface of the material. Such a test on a rod will find tiny surface flaws and tend to push and run the flaw through the entire cross section of the rod.

In use of the device, the test specimen may be threaded onto the pistons or the specimen and pistons may be made as one piece. The test specimen may be round, rectangular, square or any other desired shape between the pistons. Obviously the device may be used to produce various loading conditions (1) tension plus external pressure, (2) torsion and (3) any combination of external pressure, tension, and torsion.

The cylinder may be closed at one end and the closed end axially threaded on the inner end. Then a test specimen may be threaded into the threaded closed end and with a piston on the free end, the specimen will move axially in only one direction under pressure.

Obviously many modifications and variations of the present invention are possible in the light of the above teachings. It is therefore to be understood that the invention may be practiced otherwise than as specifically described.

What is claimed and desired to be secured by Letters Patent of the United States is:

1. A combined loading device; which comprises:
   an open ended cylindrical member,
   means for securing a test specimen within said cylindrical member,
   said means for securing said test specimen within said cylinder including at least one axially movable piston having an outer diameter substantially the same diameter as the inner diameter of said cylindrical member and an end portion extending from the end of said cylindrical member,
   an aperture through said cylindrical member through which a fluid under pressure may be admitted into said cylindrical member to apply an axial force on said piston, and
   a torsion bar,
   said torsion bar secured to the end portion of said piston extending from said cylindrical member such that said torsion bar is normal to the axis of said cylindrical member.

2. A combined loading device as claimed in claim 1 which includes:
   a torque applying means secured to said cylindrical member and so positioned to apply a torque force to said piston to which said torsion bar is secured.

3. A combined loading device as claimed in claim 1 which includes:
   two opposing axially movable pistons each having an outer diameter substantially the same diameter as the inner diameter of said cylindrical member, and
   said aperture through said cylindrical member is positioned such that a fluid may be admitted therethrough into an area between said two pistons.

References Cited

UNITED STATES PATENTS

| | | | |
|---|---|---|---|
| 2,426,390 | 8/1947 | De Forest | 73—88.5 X |
| 3,492,862 | 2/1970 | Wallace | 73—97 |
| 3,517,551 | 6/1970 | Biegel | 73—97 |

JERRY W. MYRACLE, Primary Examiner

U.S. Cl. X.R.

73—99